United States Patent [19]

Iwama

[11] Patent Number: 4,682,014
[45] Date of Patent: Jul. 21, 1987

[54] SIMPLE DATA INPUT APPARATUS
[75] Inventor: Teruhiko Iwama, Kawasaki, Japan
[73] Assignee: Nitsuko Limited, Kanagawa, Japan
[21] Appl. No.: 815,486
[22] Filed: Jan. 2, 1986
[51] Int. Cl.⁴ .............................................. G06F 15/20
[52] U.S. Cl. ...................................... 235/375; 235/487
[58] Field of Search ................................ 235/375, 487

[56] References Cited
U.S. PATENT DOCUMENTS 4,460,844 7/1984 Kadogaki .......................... 235/375

Primary Examiner—Harold I. Pitts
Attorney, Agent, or Firm—Armstrong, Nikaido, Marmelstein & Kubovcik

[57] ABSTRACT

A simple data input apparatus is equipped with a magnetic card reader and uses an input guide sheet. The input guide sheet has such input items as service number, commodity number, quantity and unit price printed thereon and includes a magnetic strip storing the order in which these items are to be indicated. The simple data input apparatus is provided with an input guide section on which a plurality of indicating lamps are arranged. The data stored on the magnetic strip of the input guide sheet are read by the magnetic card reader and written into a RAM provided inside the apparatus. The input guide sheet is then placed on the input guide section and the indicating lamps light sequentially in accordance with the input item indication order written into the RAM from the magnetic strip. The operator enters those input items printed on the guide sheet that correspond to the lighted indicating lamps, thereby placing the apparatus display unit or a printer in an input mode to display or print out the entered information.

7 Claims, 9 Drawing Figures

SIMPLE DATA INPUT APPARATUS

BACKGROUND OF THE INVENTION

This invention relates to a simple data input apparatus equipped with a magnetic card reader.

A simple data input apparatus generally has data transmitting and receiving functions. When data input processing is performed by such a simple data input apparatus, transmission data entered in accordance with an input procedure displayed on a display unit of the apparatus are transmitted to a computer at a control center through a public telephone line. These data are checked and processed at the center, from which the results of processing are sent in the form of response data to the simple data input apparatus through the public telephone line. The received data are displayed on a display unit or printed out by means of a printer.

In a simple data input apparatus of the above-described type, the input procedure is displayed by a dot display configuration or, alternatively, by indicating lamps provided on a control panel and turned on and off to form the characters that describe the input procedure. In either case, the input procedure is programmed in a read-only memory (ROM) provided in the input apparatus or in a ROM built in a microcomputer. Consequently, when it is desired to diversify the input items and the contents of services, a large number of program ROMs and display lamps is required. Further, if the number of service centers increases or the contents of services (types of input items, data format, etc.) change after the simple data input apparatus has been installed, the display panel of the conventional input apparatus of this type must be changed and the program in the apparatus ROM or in the ROM of the microcomputer must be rewritten. These problems will assume greater significance as simple data input apparatus of the above kind become more widespread in the market.

SUMMARY OF THE INVENTION

An object of the present invention is to provide a simple data input apparatus which solves the aforementioned problems encountered in the prior art.

Another object of the present invention is to provide a simple data input apparatus in which it is unnecessary to rewrite the program in the apparatus ROM or in the ROM of a microcomputer even if there is a change in input items or the contents of services after the apparatus is installed.

According to the present invention, the foregoing objects are attained by providing a simple data input apparatus equipped with a magnetic card reader and using an input guide sheet. The input guide sheet has such input items as service number, commodity number, quantity and unit price printed thereon and includes a magnetic strip storing the order in which these items are to be indicated. The simple data input apparatus is provided with an input guide section on which a plurality of indicating lamps are arranged. The data stored on the magnetic strip of the input guide sheet are read by the magnetic card reader and written into a RAM provided inside the apparatus. The input guide sheet is placed on the input guide section and the indicating lamps light sequentially in accordance with the input item indication order written into the RAM from the magnetic strip. The operator enters those input items printed on the guide sheet that correspond to the lighted indicating lamps, thereby placing the apparatus display unit or a printer in an input mode to display or print out the entered information.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
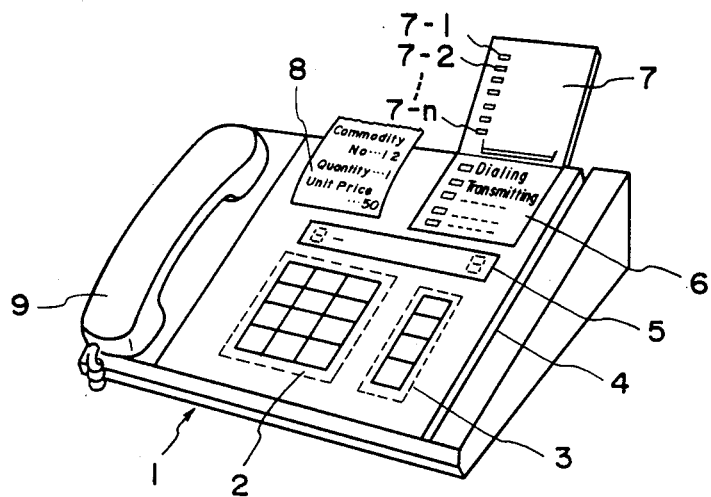
FIG. 1 is a perspective view showing the general external appearance of an embodiment of a simple data input apparatus according to the present invention.

FIG. 1 is a perspective view showing the general external appearance of an embodiment of a simple data input apparatus according to the present invention. The simple data input apparatus indicated at reference numeral 1 includes numeric keys 2, function keys 3 and a guide sheet insertion slot 4 in which a magnetic strip on an input guide sheet, described below, is inserted so that data stored on the magnetic strip may be read by a card reader. The data input apparatus also has a data display section 5, a mode display section 6 for displaying the operating mode of the data input apparatus, an input guide display section 7, and a telephone handset 9. The input guide display section 7 includes an array of plural indicating lamps 7-1, 7-2 . . . 7-n which indicate a procedure for entering data. Numeral 8 denotes a slip of paper on which information is printed by means of a printer.

Figure 2:
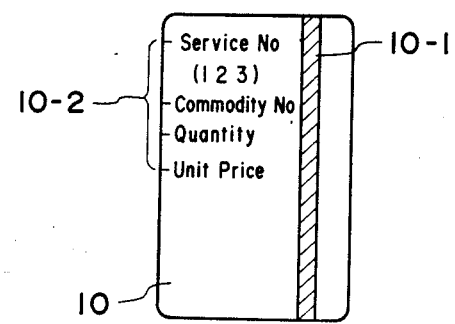
FIG. 2 is a plan view illustrating an embodiment of an input guide sheet.
Figure 3:
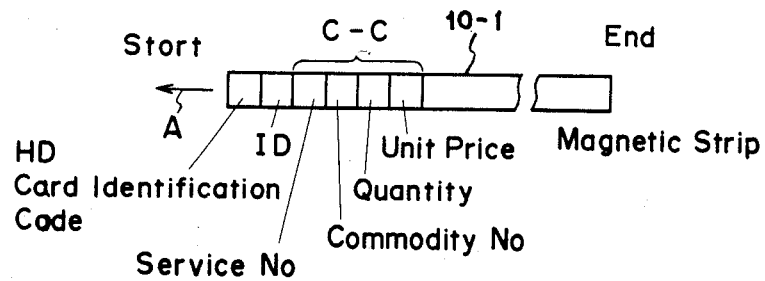
FIG. 3 is a view for describing what is stored on a magnetic strip of the input guide sheet.

FIG. 2 is a plan view showing an embodiment of an input guide sheet used for entering data in the simple data input apparatus of FIG. 1. The input guide sheet, which is indicated at reference numeral 10, includes a magnetic strip 10-1 storing an input item display sequence. Printed on the surface of the input guide sheet 10 are names 10-2 of various input items. FIG. 3 is a view for describing what is recorded on the magnetic strip 10-1 of the input guide sheet 10. As illustrated, the magnetic strip 10-1 stores, in the order mentioned, such data as a card identification code, ID code, service number, commodity number, quantity and unit price.

Figure 4:
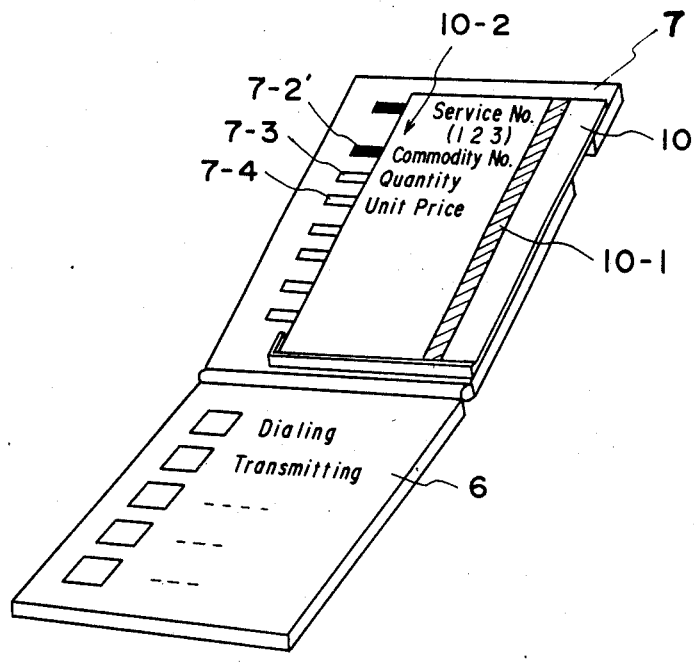
FIG. 4 is a perspective view showing indicating lamps turned on and off after the input guide sheet of FIG. 2 is placed upon the input guide section of the simple data input apparatus shown in FIG. 1.

FIG. 4 is a perspective view showing the input guide sheet 10 of FIG. 2 placed upon the input guide section 7 of the simple data input apparatus 1 depicted in FIG.

1, and showing also the manner in which the indicating lamps are turned on and off. Numeral 7-2' shows that one of the indicating lamps of the input guide section 7 is lit.

Figure 5:
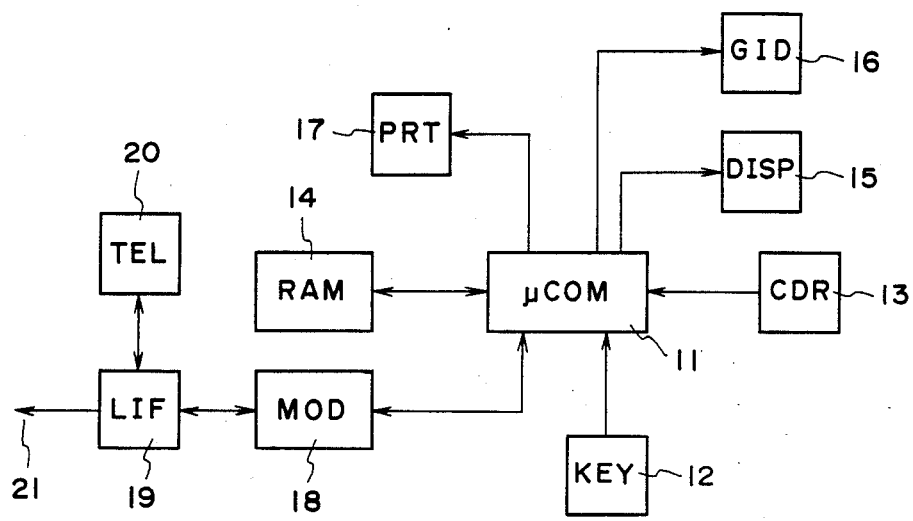
FIG. 5 is a block diagram illustrating the circuit arrangement of the simple data input apparatus.

FIG. 5 is a block diagram illustrating the circuit construction of the simple data input apparatus 1. The circuitry includes a microcomputer (uCOM) 11, a key switch (KEY) 12 connected to the microcomputer 11 and including the numeric keys 2 and function keys 3, a magnetic card reader (CDR) 13 connected to the microcomputer 11 for reading the data recorded on the magnetic strip 10-1 of input guide sheet 10, a random-access memory (RAM) 14 connected to the microcomputer 11, a display unit (DISP) 15 connected to the microcomputer 11 for displaying input data as well as the operating mode of the data input apparatus 1, an input guide unit (GID) 16 connected to the microcomputer 11 for receiving the input guide sheet 10 and for displaying the input procedure, a printer (PRT) connected to the microcomputer 11, a modem (MOD) 18 connected to the microcomputer 11, and a line interface (LIF) 19 connected to the modem 18. The line interface 19 is also connected to a telephone circuit 20 and telephone line 21.

The operation of the simple data input apparatus 1 having the foregoing construction will now be described.

As shown in FIG. 3, the card identification code and ID code are recorded beforehand on the magnetic strip 10-1 of the input guide sheet 10 depicted in FIG. 2. Also recorded beforehand on the magnetic strip 10-1 so as to control the indicating lamps 7-1, 7-2 ... 7-n and printer are indicating lamp and printer control codes C-C which, in the illustrated embodiment, are the service number, commodity number, quantity and unit price mentioned above.

The operator introduces power to the apparatus and passes the magnetic strip-portion of the input guide sheet 10 through the guide sheet insertion slot 4 in the direction of the arrow A, namely toward a head HD of the magnetic card reader (CDR) 13 depicted in FIG. 5. The magnetic card reader 13 reads the stored data from the magnetic strip 10-1 in the order in which the data has been recorded on the strip (from left to right in FIG. 3) and the microcomputer 11 stores these data in the RAM 14. Next, the operator places the input guide sheet 10 on the input guide display section 7 of FIG. 1 in the manner illustrated in FIG. 4.

Meanwhile, the microcomputer 11 checks the read data for errors and, if the data have been read correctly, causes the data display section 5 to display a message such as "NUMBER PLEASE" calling for the entry of the service number item printed on the input guide sheet 10. In response, the operator uses the numeric keys 2 to enter the service number (123 in the illustrated embodiment) printed on the input guide sheet 10 resting on the input guide display section 7. If the microcomputer 11 confirms that the number entered by the operator and the number (123) read from the magnetic strip 10-1 agree, the microcomputer 11 causes the input guide unit (GID) 16 to light the lamps of the data display section 5 that correspond to the service number on the input guide sheet 10 and, further, to light the indicating lamp 7-2 (as shown at 7-2' in the embodiment of FIG. 4) corresponding to the particular input item (the commodity number in the embodiment of FIG. 4) on the input guide display section 7. The activated lamp 7-2 indicates to the operator that the commodity number is to be entered next. When the operator enters the commodity number by using the numeric keys 2 shown in FIG. 1, the data display section 5 displays the entered commodity number. At the same time, the microcomputer 11 reads character data, namely "COMMODITY" in the illustrated embodiment, which has been written into the RAM 14 from the input guide sheet 10, and causes the printer (PRT) 17 to print out "COMMODITY" alongside the entered commodity number. The microcomputer 11 also causes the commodity number indicating lamp 7-2 of input guide display section 7 to be extinguished and causes the next input item indicating lamp 7-3, namely the quantity indicating lamp in the illustrated embodiment, to be activated, thus calling for the entry of quantity. When this input item is entered in the manner described above, the microcomputer 11 goes to the RAM 14 to read out character data corresponding to quantity and causes the printer (PRT) 17 to print out these character data alongside the quantity entered by the operator. The quantity indicating lamp 7-3 of the input guide display section 7 is turned off and the next input item indicating lamp 7-4, namely the unit price indicating lamp in the illustrated embodiment, is turned on, thus calling for the entry of unit price. The character data and the entered numerical values mentioned above are printed out on the slip of paper 8 in the manner shown in FIG. 1. Thus, the data entered by the operator can be set in the RAM 14 while confirmation is made by viewing the indicating lamps 7-1, 7-2 ... 7-n of the input guide display section 7 and the information printed out on the paper 8 by the printer 17. At the completion of this setting operation, the operator presses an input key (not shown) included among the functions keys 3 to preset the data that are to be transmitted via the telephone line. These preset data are stored in the RAM 14. Next, the operator presses a dial key (not shown) included among the function keys 3 and enters the desired telephone number by using the numeric keys 2, thus placing a call to the aforementioned control center. Upon receiving a response from the center via the telephone circuit 20, the operator presses a transmit key (not shown) included among the function keys 3, whereby the microcomputer 11 delivers the data preset in the RAM 14 to the telephone line 21 via the modem (MOD) 18 and line interface (LIF) 19 so that the data are transmitted to the center (not shown). The results of processing performed by the computer at the center are transmitted to the microcomputer 11 through the telephone line 21, line interface 19 and modem 18, and the microcomputer 11 delivers these results to the printer 17 and display unit 15. The foregoing operating modes of the apparatus, namely the data entry, transmission, reception and processing modes, etc., are indicated on the mode display section 6.

Figure 6:
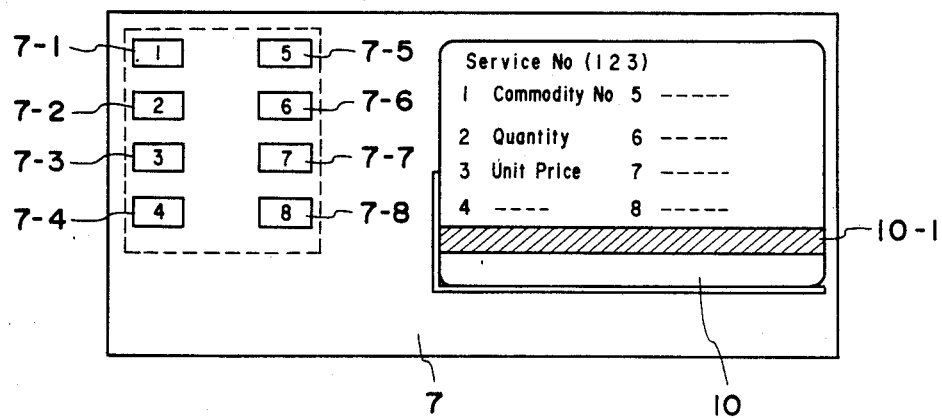
FIG. 6 is a perspective view illustrating the input guide sheet placed upon an input guide display section.

It will be appreciated from the drawings, particularly FIG. 4, that the indicating lamps 7-1, 7-2 ... 7-n of the input guide display section 7 are arranged to be alongside the input items of the input guide sheet when the guide sheet is placed upon the display section 7. However, an arrangement such as shown in FIG. 6 can be adopted, in which positional correspondence is established between the indicating lamps 7-1 through 7-8 and the input items printed on the surface of the input guide sheet 10. In other words, in the arrangement illustrated in FIG. 6, the portion of the input guide display section on which the input guide sheet 10 is placed and the portion on which the indicating lamps 7-1 through 7-8 are arranged are physically separated from each other and the numbers 1 through 8 of input items printed on the input guide sheet 10 are indicated by the numbers of the corresponding indicating lamps 7-1 through 7-8.

Figure 7:
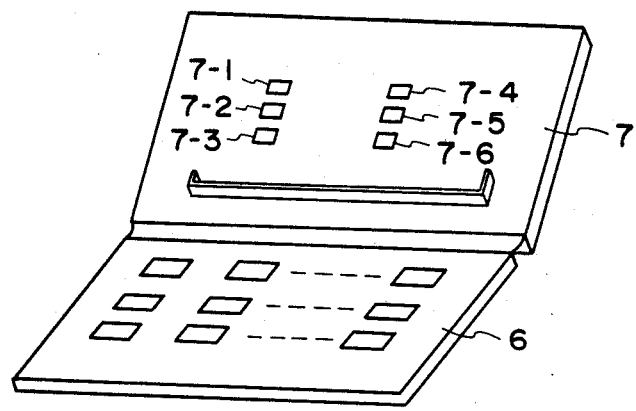
FIG. 7 is a perspective view illustrating a mode display section and an input guide display section according to another embodiment of the simple data input apparatus of the present invention.

FIG. 7 is a perspective view illustrating the mode display section 6 and input guide display section 7 of the simple data input apparatus 1 according to another embodiment of the present invention. In this embodiment, the portion of the input guide display section 7 on which the input guide sheet 10 is placed is provided with the plural indicating lamps 7-1 through 7-6 arranged in the manner shown.

Figure 8:
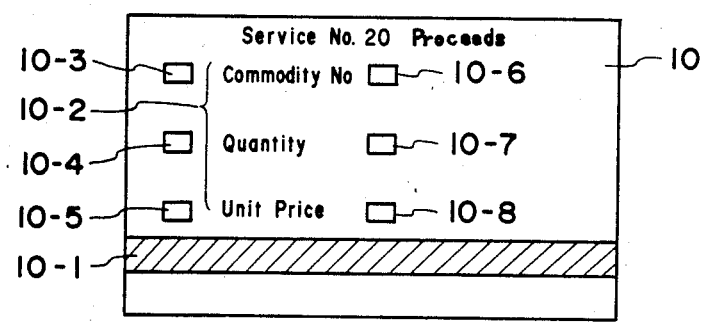
FIG. 8 is a plan view showing another embodiment of an input guide sheet.

FIG. 8 is a plan view illustrating the input guide sheet 10 placed on the input guide section 7 shown in FIG. 7. The input guide sheet 10 is provided with the magnetic strip 10-1 storing the item data shown in FIG. 3 and has the group of input items 10-2, such as the commodity number, quantity and unit price, printed on its surface. The input guide sheet 10 is also provided with windows 10-3 through 10-8 at positions corresponding to respective items of the group of input items 10-2 in such a manner that the indicating lamps 7-1 through 1-7 may be seen when they are activated.

Figure 9:
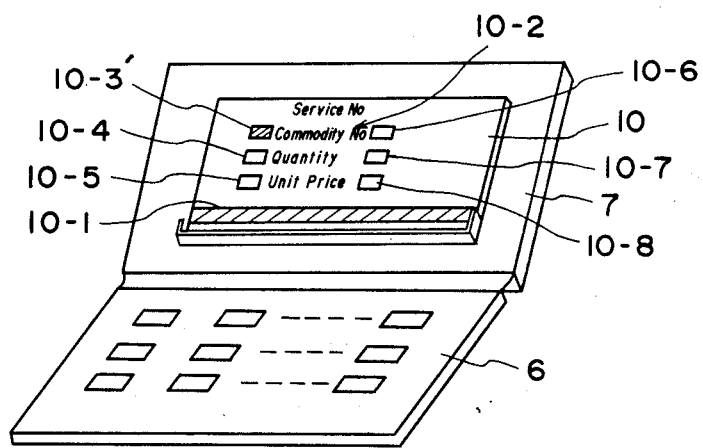
FIG. 9 is a perspective view illustrating the input guide sheet of FIG. 8 placed upon the input guide display section of FIG. 7.

FIG. 9 is a perspective view illustrating the input guide sheet 10 of FIG. 8 placed upon the input guide display section 7 of FIG. 7. In FIG. 9, 10-3' illustrates a condition in which the indicating lamp 7-1 has been turned on.

With regard to the mode display section 6, input guide display section 7 and input guide sheet 10 in the arrangement of FIGS. 7 through 9, the microcomputer 11 checks the read data for errors and, if the data have been read correctly, causes the data display section 5 to display the service number of the input guide sheet 10. Thereafter, the microcomputer 11 causes the input guide unit (GID) 16 to light the indicating lamp 7-1 of the commodity number input item so that the display calling for entry of this input item may be viewed through the window 10-3 (10-3' in FIG. 9) of the input guide sheet 10. When the operator enters the commodity number by using the numeric keys 2 shown in FIG. 1, the data display section 5 displays the entered commodity number. At the same time, the microcomputer 11 reads data out of the RAM 14 and causes the printer (PRT) 17 to print out these data alongside the commodity number entered by the numeric keys 2. The microcomputer 11 also causes the commodity number indicating lamp 7-1 of input guide display section 7 to be extinguished and causes the next input item indicating lamp 7-2, namely the quantity indicating lamp in the illustrated embodiment, to be activated, thus calling for the entry of quantity. Similar operations are repeated just as in the earlier embodiment.

In the embodiment of the input guide sheet 10 shown in FIG. 8, the windows 10-3 through 10-8 are provided at positions corresponding to the input items printed on the surface of the input guide sheet, and the lighting of the indicating lamps 7-1 through 7-6 that indicate the input procedure are viewed through these windows. However, it is obvious that the sheet-like member constituting the input guide sheet 10 can be made of a translucent or transparent material to enable the lighted lamps 7-1 through 7-6 to be seen through the sheet.

Thus, according to the present invention as described above, data recorded on a magnetic strip provided on an input guide sheet are read into a random-access memory of the simple data input apparatus, thereby allowing an input procedure corresponding to the input guide sheet to be displayed. Accordingly, if there is a change in an input item or in the contents of a service after the data input apparatus is installed, it will suffice if an input guide sheet conforming to the service is provided. In other words, by providing the proper input guide sheet, the change can be accommodated for without encountering the problems of the prior art, namely without increasing the number of read-only memories and the number of indicating lamps and without requiring a change in a display panel or rewriting of a program stored in the apparatus or microcomputer read-only memory.

As many apparently widely different embodiments of the present invention can be made without departing from the spirit and scope thereof, it is to be understood that the invention is not limited to the specific embodiments thereof except as defined in the appended claims.

What we claim is:

1. A simple data input apparatus having a magnetic card reader, a memory for storing data read by said magnetic card reader, and an input guide section having a plurality of indicating lamps, said apparatus being provided with an input guide sheet having input items printed on a surface thereof for inputting of data to said apparatus and including a magnetic strip having the order in which these items are to be indicated stored thereon in advance, wherein the input items stored on said magnetic strip are read by said card reader and stored in said memory, after which said input guide sheet is placed on said input guide section and said indicating lamps are lighted in dependence upon data stored in said memory and in accordance with the input items printed on said input guide sheet.

2. The simple data input apparatus according to claim 1, wherein said indicating lamps are so arranged as to be situated in the vicinity of the input items printed on said input guide sheet when said input guide sheet is placed on said input guide section.

3. The simple data input apparatus according to claim 1, wherein numbers written on or near said indicating lamps, numbers identical with a diagram or the diagram are so printed as to correspond to the input items printed on the input guide sheet, whereby correspondence is established between said indicating lamps and said input items printed on said input guide sheet.

4. A simple data input apparatus having a magnetic card reader, a memory for storing data read by said magnetic card reader, and an input guide section having a plurality of indicating lamps, said apparatus being provided with an input guide sheet having input items printed on a surface thereof for inputting of data to said apparatus, viewing portions corresponding to said printed input items for enabling lighted ones of said indicating lamps to be viewed, and a magnetic strip having the order in which these items are to be indicated stored thereon in advance, wherein the input items stored on said magnetic strip are read by said card reader and stored in said memory, after which said input guide sheet is placed on said input guide section and said indicating lamps are lighted in dependence upon data stored in said memory and in accordance with the input items printed on said input guide sheet.

5. The simple data input apparatus according to claim 4, wherein the viewing portions of said input guide sheet are holes through which said indicating lamps can be viewed.

6. The simple data input apparatus according to claim 4, wherein said input guide sheet comprises a translucent material.

7. The simple data input apparatus according to claim 4, wherein said input guide sheet comprises a transparent material.

* * * * *